3,325,421
STABLE DISPERSION OF A UREA AND METHOD OF MAKING SAME
Erwin Muller, Leverkusen, Germany, assignor to Farbenfabriken Bayer Aktiengesellschaft, Leverkusen, Germany, a corporation of Germany
No Drawing. Filed Feb. 6, 1964, Ser. No. 343,145
Claims priority, application Germany, Feb. 12, 1963, F 39,001
6 Claims. (Cl. 252—308)

The present invention relates to a process for the preparation of polyurea polyaddition products.

It has been known heretofore to prepare polyureas from organic diisocyanates and compounds containing two primary or secondary amino groups. It is also known to react hydrazines and hydrazides having at least two reactive hydrogen atoms with diisocyanates to form polyaddition products, and if suitable initial reactions are chosen, high molecular weight, high melting, linear and in some cases, fiber-forming polyaddition products are obtained. Such reactions for the preparation of polyureas are usually carried out in solvents inert to the reactants. These solvents, which must be anhydrous in addition to being inert, are cumbersome and expensive in practical applications, and require that the polyaddition product of the reaction undergo extensive purification procedures to insure the complete separation of the desired end product from the solvent in which it was fabricated. Therefore, the end product must usually be separated out as a precipitate, washed, filtered, and dried. Should a stable dispersion of the polyurea be desired, such a product would necessarily suffer the disadvantage of incorporating therein some of the undesirable solvent which may easily impair the properties of the product in which the dispersion is employed unless such extensive purification procedures involving the steps outlined above are employed.

It is, therefore, an object of this invention to provide a method for the preparation of a polyurea which is devoid of all the foregoing disadvantages. Another object of this invention is to provide a method for producing a stable dispersion of the polyurea polyaddition product in a solvent which need not be separated therefrom prior to the use of the polyurea as a thickening agent. Yet another object of this invention is to provide a medium for the polyaddition reaction which yields a polyurea product which is a dispersion compatible with textiles and dyestuffs and adapted to be used as auxiliary agents therefor. Still another object of this invention is the production of a stable dispersion of a polyurea which can be used as a modifier of dyestuffs and auxiliary textile agents without filtering, washing and drying the product before a dispersion thereof may be prepared.

These and other objects which may become apparent from the following description are accomplished in accordance with this invention, generally speaking, by providing a method for the preparation of a stable dispersion of a polyurea by a reaction between an organic diisocyanate and a primary diamine, secondary diamine, hydrazine or difunctional hydrazide wherein the number of isocyanato groups are substantially equilavent to the number of nitrogen atoms having bonded thereto hydrogen atoms which hydrogen atoms are more reactive with respect to the isocyanato groups than the hydrogen atoms of the hydroxyl groups of a polyhydric alcohol which is liquid at the reaction temperature and which is used as a solvent therefor.

Any suitable polyhydric alcohol having primary or secondary hydroxyl groups may be used in accordance with this invention as the inert solvent in the preparation of polyaddition products from diamines, hydrazines or difunctional hydrazides and diisocyanates. Because of the different reactivity between the hydrogen atoms bonded to the nitrogen atoms and the polyisocyanate, and the hydroxyl groups of the solvent and the polyisocyanate, it has been found that a preferential reaction between the hydrogen atoms bonded to the nitrogen atoms and the isocyanato groups occurs with such a sharp differentiation that a stable dispersion of a polyurea in the polyhydric alcohol can be prepared without substantial reaction of the solvent provided that substantially stoichiometric equivalents of isocyanato groups per equivalents of the functional groups of the diamine or the like compounds are mixed together.

It has been found that the polyaddition product which results from the preferential reaction between the diisocyanate and the diamine while in the polyhydric alcohol is produced in a finely divided form in the polyhydric alcohol and the distribution of the polyaddition product of the reaction is so fine that no sedimentation occurs even after prolonged standing.

Any suitable primary and secondary diamines customarily used in the preparation of polyureas may be used in the practice of this invention. Examples of such suitable compounds are, for example, ethylene diamine, tetramethylene diamine, hexamethylene diamine, N,N'-dimethyl-ethylene diamine, N-methyldipropylene triamine, 1,4-cyclohexylene diamine, p-phenylene diamine, 1,5-naphthylene diamine, 4,4'-diamino diphenylmethane, piperazine and N,N'-diaminopiperazine. Examples of hydrazines and difunctional hydrazides which may be used are hydrazine, N,N'-dimethylhydrazine, N,N'-diethylhydrazine, carbodihydrazide, adipic acid dihydrazide and tetramethylene-1,4-di-carboxylic acid hydrazide. For purposes of expediency, all of these compounds and others suitable in a reaction with a diisocyanate to form a polyurea will hereinafter be designated simply as diamines. It is to be understood that the hydrazines and difunctional hydrazides as well as primary and secondary diamines are meant to be encompassed by this designation.

Any suitable organic diisocyanate may be used including aliphatic and aromatic polyisocyanates. Examples of suitable organic diisocyanates including the heterocyclic organic diisocyanates are 1,6-hexamethylene diisocyanate, 1,4-butylene diisocyanate, furfurylidene diisocyanate and the preferred aromatic diisocyanates including 2,4-toluylene diisocyanate, 2,6-toluylene diisocyanate and mixtures thereof, preferably a mixture of about 80 percent 2,4- and 20 percent 2,6-toluylene diisocyanate, 4,4'-diphenylmethane diisocyanate, 4,4'-diphenyl-3,3'-dimethyl methane diisocyanate, 1,5-naphthalene diisocyanate, 1-methyl-2,4-diisocyanato-5-chlorobenzene, 2,4-diisocyanato-s-triazine, 1-methyl-2,4-diisocyanato cyclohexane, p-phenyl diisocyanate, 1,4-naphthalene diisocyanate.

Any suitable high molecular weight organic compound containing at least two alcoholic hydroxyl groups and which is liquid at the reaction temperature may be used. Examples of suitable types of organic compounds containing at least two hydrogen containing groups are hydroxyl polyesters, polyhydric polyalkylene ethers, polyhydric polythioethers, polyacetals, aliphatic polyols, including alkane, alkene and alkyne diols, triols, tetrols and the like.

The molecular weight of the organic compound containing at least two active hydrogen containing groups may vary over a wide range. Preferably, however, the organic compounds containing at least two hydroxyl groups which are used as a solvent in the production of the polyurea has a molecular weight of at about about 500 and preferably between about 500 and about 3500 with an hydroxyl number less than about 225 an acid number, where applicable, below about 5 and may be either linear or branched. A satisfactory upper limit for the molecular weight of the organic compound containing at least two hydroxyl groups is about 10,000 but this limitation may vary so long as satisfactory mixing of the organic compound containing at least hydroxyl groups with the organic diisocyanate and the diamine or a like compound can be obtained.

Any suitable hydroxyl polyester may be used such as are obtained, for example, from polycarboxylic acids and polyhydric alcohols. Any suitable polycarboxylic acid may be used such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, trimellitic acid, trimesic acid, mellophanic acid, prehnitic acid, pyromellitic acid, benzene-pentacarboxylic acid, 1,4-cyclohexanedicarboxylic acid, 3,4,9,10-perylenetetracarboxylic acid and the like. Any suitable polyhydric alcohol may be used such as, for example, ethylene glycol, 1,3-propylene glycol, 1,2-butylene glycol, 1,2-propylene glycol, 1,4-butylene glycol, 1,3-butylene glycol, 1,5-pentane diol, 1,4-pentane diol, 1,3-pentane diol, 1,6-hexane diol, 1,7-heptane diol, glycerine, trimethylolpropane, 1,3,6-hexane triol, triethanolamine, pentaerythritol, sorbitol and the like.

Any suitable polyhydric polyalkylene ether may be used such as, for example, the condensation product of an alkylene oxide beginning with any suitable initiator. The initiator may be a difunctional compound including water so that the resulting polyether is essentially a chain of repeating alkylene oxy groups as in polyethylene ether glycol, polypropylene ether glycol, polybutylene ether glycol, and the like; or the initiator may be any suitable active hydrogen containing compound which may be a monomer or even a compound having a relatively high molecular weight including other active hydrogen containing compounds as disclosed herein. It is preferred that the initiator have from 2 to 8 active sites to which the alkylene oxides may add, including, for example, amines, alcohols and the like. Any suitable alkylene oxide may be used such as, for example, ethylene oxide, propylene oxide, butylene oxide, amylene oxide, tetrahydrofuran, epihalohydrins such as epichlorohydrin, styrene oxide and the like. Any suitable initiator may be used including, for example, water, polyhydric alcohols, preferably having 2 to 8 hydroxyl groups. Phosphorous acids may also be used, but the phosphorous compounds are somewhat peculiar in that a different mode of preparation may be required, as more particularly set forth below. The resulting polyhydric polyalkylene ethers with the base of phosphorous and the like may have either primary or second hydroxyl groups. It is preferred to use alkylene oxides which contain from 2 to 5 carbon atoms and, generally speaking, it is advantageous to condense from about 5 to about 30 mols of alkylene oxide per functional group of the initiator. There are many desirable processes for the preparation of polyhydric polyalkylene ethers including U.S. Patents 1,922,459, 3,009,939 and 3,061,625 or by the process disclosed by Wurtz in 1859 and in Encyclopedia of Chemical Technology, volume 7, pages 257 to 262, published by Interscience Publishers, Inc. (1951).

Specific examples of initiators are water, ethylene glycol, propylene glycol, glycerine, trimethylol propane, pentaerythritol, arbitol, sorbitol, maltose, sucrose, and the like. The phosphorous containing polyols are more fully described below.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

Any suitable polyacetal may be used such as, for example, the reaction product of formaldehyde or other suitable aldehyde with a polyhydric alcohol such as those disclosed above for use in the preparation of the hydroxyl polyesters.

In the preferred embodiment of this invention, the diamine, hydrazine, or hydrazide is first dissolved at room temperature in a polypropylene glycol ether having a molecular weight of at least about 500 and an hydroxyl number of about 56. An amount of toluylene diisocyanate is added wherein the number of isocyanato groups is only stoichiometrically equivalent to the number of hydrogen atoms of the amine groups which are more reactive with isocyanato groups than the active hydrogen atoms of the hydroxyl groups of the polyhydroxy polyether. The reaction mixture is stirred vigorously and an exothermic reaction takes place. The polyurea settles out after a few minutes and stirring is continued while heat is applied for one hour so that the reaction temperature reaches about 50 or 60° C. A stable viscous dispersion is obtained which has an hydroxyl number generally between about 50 to about 80.

Where the reaction product required necessitates the use of reactants or polyhydric alcohol which are not liquid at room temperature, the components may be heated to their liquid state and the process of this invention may then be carried out. However, the maximum temperature of the reaction mixture should never exceed about 150° C. and it is preferred to carry out the reaction at temperatures increased to only between about 50° and 60° C.

The quantity of the initial reactants to be used depends on the desired viscosity of the emulsion product, and the proportions of the initial reactants depends on the desired molecular weight of the polyurea product. Generally, the overall quantity of the initial reactants is chosen so that the final product has a solids content of between about 5 to 40%. It is demonstrated in the process of this invention that even small quantities of of the polyurea formed in the high molecular weight polyhydroxyl containing compound cause a considerable increase in the viscosity of the polyhydroxyl containing compound, so that a stable dispersion of siginficant viscosity may be readily obtained even in the instance that as small an amount of the polyurea in the polyhydric alcohol as 5% is obtained.

The molecular weight of the polyurea produced is determined by the proportion of the diamine, hydrazine or hydrazide to the diisocyanate in the initial reaction mixture. Although the preferred quantities to be used in the practice of this invention are those in which the isocyanato groups are present in stoichiometric equivalents to the active hydrogen atoms of the diamine, in which case the molecular weight of the polyurea obtained is the highest possible attainable molecular weight, smaller quantities of the diisocyanate may be employed in which case the polyaddition products will contain amine groups. In the latter instance, the reaction product also occurs in a finely divided form in the reaction medium and may be treated in a manner analogous to that already described herein with reference to the high molecular weight polyaddition products.

The polyureas obtained by the process of this invention are therefore in the form of stable emulsions which are particularly suitable for use as thickener pastes, and which are peculiarly compatible with textiles and dyestuffs making them especially valuable as auxiliary agents therefor.

The invention is further illustrated but not limited by the following examples in which all parts are by weight unless otherwise specified.

*Example 1*

About 52.2 parts of toluylene diisocyanate are added dropwise at room temperature with vigorous stirring to about 1000 parts of polypropylene glycol ether (OH number 56) after the addition of about 15 parts of hydrazine hydrate. The temperature rises to about 45° C. and polyurea separates out. After stirring for about one hour, the hydrazine hydrate produced with water is removed at about 120° C. and 12 mm. Hg and a milky, viscous emulsion of OH number 81 is obtained.

In the same manner, the following components are reacted in about 1000 parts of polypropylene glycol ether (OH number 56).

About 5 parts hydrazine hydrate with about 17.4 parts toluylene diisocyanate.

About 10 parts hydrazine hydrate with about 34.8 parts toluylene diisocyanate.

About 10 parts hydrazine hydrate with about 33.6 parts hexamethylene diisocyanate.

The emulsions obtained have —OH numbers of 79, 78 and 51.

*Example 2*

About 17.4 parts of toluylene diisocyanate are introduced dropwise into about 1000 parts of a polypropylene glycol ether (OH number 56) after the addition of about 14.5 parts of N-methyldipropylene triamine. The temperature rises to about 50° C. with separation of polyurea. After stirring for about one hour, the viscous emulsion has an OH number of 62.

*Example 3*

About 61 parts of 2,4-toluylene diamine are dissolved in about 1000 parts of polypropylene glycol ether (OH number 56) at about 80° C. About 87 parts of toluylene diisocyanate are added dropwise with vigorous stirring at the same temperature, the temperature then rising to about 110° C. The reaction mixture is then heated for one hour at the same temperature, and a viscous emulsion of OH number 73 is obtained.

*Example 4*

About 7.5 parts of an 80% aqueous ethylene diamine solution is stirred into about 1000 parts of a polypropylene glycol ether (OH number 56). About 17.4 parts of toluylene diisocyanate is then added dropwise at room temperature with vigorous stirring, whereupon the polyurea separates and the temperature rises to about 45° C. After stirring for another hour, the remaining water is removed at about 120° C. at 12 mm. Hg and a viscous emulsion of —OH number 67 is obtained.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A method for making a stable dispersion of a urea in an organic polyhydroxy compound which comprises reacting at a temperature of about 150° C. or less, a stoichiometrically equivalent amount or less of an organic diisocyanate per equivalent of a diamine while the diamine is dissolved in a liquid organic compound having at least two alcoholic hydroxyl groups, a molecular weight of at least 500 and an hydroxyl number of not more than about 225.

2. A method for making a stable dispersion of an urea in an organic polyhydroxy compound which comprises reacting at a temperature of about 150° C. or less, substantially stoichiometric equivalents of a diamine and an organic diisocyanate while the diamine is dissolved in a liquid organic compound having at least two alcoholic hydroxyl groups, a molecular weight of at least about 500 and an hydroxyl number of not more than about 225.

3. The method of claim 1 in which the diamine is a member selected from the group consisting of difunctional primary and secondary amines, hydrazines and hydrazides.

4. The method of claim 1 in which the organic diisocyanate is toluylene diisocyanate.

5. The method of claim 1 in which the organic compound having at least two alcoholic hydroxyl groups is a polypropylene glycol ether having a molecular weight of at least about 500 and an hydroxyl number of about 56.

6. The product of the method of claim 1.

References Cited

UNITED STATES PATENTS

| | | | |
|---|---|---|---|
| 2,929,803 | 3/1960 | Frazer et al. | 260—77.5 |
| 2,929,804 | 3/1960 | Steuber | 260—77.5 |

LEON D. ROSDOL, *Primary Examiner.*

JULIUS GREENWALD, ALBERT T. MEYERS, SAMUEL H. BLECH, *Examiners.*

R. D. LOVERING, *Assistant Examiner.*